United States Patent [19]
Doshita et al.

[11] Patent Number: 5,750,257
[45] Date of Patent: May 12, 1998

[54] INSULATED ELECTRIC WIRE

[75] Inventors: Hideo Doshita; Masahiro Koyano; Akihiro Goto; Kazuhisa Ishimoto; Makoto Tai, all of Amagasaki, Japan

[73] Assignees: Optec Dai-Itchi Denko Co., Ltd., Amagasaki; Dainichiseika Color & Chemicals Mfg. Co., Ltd., Tokyo, both of Japan

[21] Appl. No.: 671,484

[22] Filed: Jun. 27, 1996

[30] Foreign Application Priority Data

Jun. 29, 1995 [JP] Japan ................................ 7-164020
Oct. 3, 1995 [JP] Japan ................................ 7-256593

[51] Int. Cl.$^6$ .................................................. B32B 15/00
[52] U.S. Cl. .................. 428/379; 428/375; 428/383; 174/110 N; 174/110 SR; 174/120 SR; 528/73; 528/84; 528/335; 528/339; 525/424; 525/436
[58] Field of Search .......................... 428/379, 383, 428/375; 174/110 N, 110 SR, 120 SR; 528/339, 335, 73, 84; 525/424, 436

[56] References Cited

U.S. PATENT DOCUMENTS

| | | | |
|---|---|---|---|
| 3,528,852 | 9/1970 | Olson et al. | 428/383 |
| 4,346,136 | 8/1982 | Lupinski | 428/383 |
| 4,350,738 | 9/1982 | Saunders et al. | 428/383 |
| 4,408,032 | 10/1983 | Sollner et al. | 428/383 |
| 4,420,535 | 12/1983 | Walrath et al. | 428/383 |
| 4,420,536 | 12/1983 | Saunders et al. | 428/383 |
| 4,505,980 | 3/1985 | Nishizawa et al. | 428/383 |
| 5,219,657 | 6/1993 | Ueoka et al. | 428/379 |
| 5,356,708 | 10/1994 | Matsuura et al. | 428/383 |

*Primary Examiner*—Patrick Ryan
*Assistant Examiner*—J. M. Gray
*Attorney, Agent, or Firm*—Schweitzer Cornman Gross & Bondell LLP

[57] ABSTRACT

An insulated electrical wire coated with a polyamide-imide insulating material which is a copolymer of anhydrotrimellitic acid, aliphatic and aromatic dicarboxylic acids and a diisocyanate, with a molar ratio of the acids to the diisocyanate of from about 0.9:1.0 to about 1.1:1.0 and optionally further containing from about 1 part wt. to about 30 parts wt. of an epoxy resin per each 100 parts of the copolymer. Optionally the aforementioned insulation can be an interior, first coating, coated by a second coating of a polyamide, polyamide-imide, and when the first coat does not contain an epoxy, then a polyimide.

12 Claims, 1 Drawing Sheet

INSULATED ELECTRIC WIRE

FIELD OF THE INVENTION

The present invention relates to an insulated electric wire which is suited for soldering and can be used as a winding or the like for electric machinery.

BACKGROUND OF THE INVENTION

A variety of insulated electric wires are covered with polyurethane insulation are well known. Soldering is easy with such a wire, because an applied coat of the insulating material on the conductor melts during soldering and decomposes under the heat of soldering without the need to peel it off physically. This referred to herein below by a reference to good soldering characteristics. With the increasing reduction of the size of electric components lately and enhancement affair performance, electric apparatus can be increasingly used for a greater variety of purposes and in may kinds of environments. Electric components are required in relative hot environment to have good heat-resistance, so that the use of the conventional electric wire insulated with a coat of the polyurethane material is no longer acceptable.

Thus, instead of the insulated electric wires having a polyurethane coat, other insulated electric wires have been developed and employed, which are coated with a modified polyester or a modified polyester imide that is better suited for soldering without the need of separately peeling it off.

Even with these newer insulated electric wires it is not possible to cope with a recent trend of using electrical apparatus in hot environments. Therefore, there is a great need for the development of a new kind of insulated electric wire which has a better heat-resistance against hot environments and can still be well employed for soldering, due to its rapid thermal decomposition.

When a solderable insulated electric wire is made the insulating coating material is applied to the conductor and it is then baked. It is desired for the achievement of a constant quality that the coating material can be effectively processed at a wide range of baking temperatures. This property is essential particularly where a large furnace is used for mass production in baking, because the inside temperature of the furnace can vary over a great temperature range.

SUMMARY OF THE INVENTION

It is a primary objective of the present invention to provide an insulated electric wire suited for soldering which has two properties that are contrary to one another, a high degree of heat resistance and good soldering characteristics, and can be mass-produced with a constant and high quality within a wide range of a baking temperatures during its processing.

It is another objective of the present invention to provide an insulated electric wire suited for soldering which has a superior moisture resistance.

It is yet another objective of the present invention to provide an insulated electric wire suited for soldering, which has other favorable properties such as good softening-resistance, abrasion-resistance and cohesiveness for a variety of purposes.

With the above and other objectives in view, the present invention provides an insulated electric wire (hereinafter, referred to as "first insulated electric wire") suited for soldering which comprises a conductor and an insulating coating applied over the conductor and is then suitable baked, wherein the insulating coating is a polyamide-imide formed from the reaction of an anhydrotrimellitic acid, aliphatic and aromatic dicarboxylic acids and a diisocyanate compound, with the mole ratio of the diisocyanate compound being approximately equal to the mole ratio of the total of the anhydrotrimellitic acid and the aliphatic and aromatic dicarboxylic acids.

In addition, the present invention provides another insulated electric wire (hereinafter referred to a "second insulated electric wire") suited for soldering, which comprises a conductor and an insulating coating applied to the conductor, and then baked wherein the insulating coating contains a polyamide-imide as a main component and an epoxy resin as an adjuvant, the polyamide-imide being formed from reaction between an anhydrotrimellitic acid, a mainly aliphatic dicarboxylic acid and a diisocyanate compound wherein the molecular ratio of the diisocyanate compound is approximately equal to the molecular ratio of all the aforesaid acids.

BRIEF DESCRIPTION OF DRAWING

The invention is being disclosed with reference being had to the drawing wherein.

DETAILED DESCRIPTION OF THE INVENTION

The polyamide-imide adapted for the insulating coating material in the first and second insulated electric wires of the present invention, differs from a known polyamide-imide in which an anhydrotrimellitic acid and a diamine are used as co-reactants, and is a product formed from a reaction between an anhydrotrimellitic acid, a dicarboxylic acid and a diisocyanate compound. This product has imido links in the principal chain, based on reaction between an acid anhydride structure of the anhydrotrimellitic acid and an isocyanate group, and amido links based on reaction between the isocyanate group and the carboxyl groups of the anhydrotrimellitic acid and dicarboxylic acid.

In the first insulated electric wire, an aliphatic dicarboxylic acid and an aromatic dicarboxylic acid are used together as the dicarboxylic acid component, so that the polyamide-imide has a structure in which an aliphatic group and an aromatic group coexist in the principal chain. On the other hand, in the second insulated electric wire the aliphatic dicarboxylic acid can be used for the dicarboxylic acid component of the polyamide-imide, while the insulating material contains an epoxy resin adjuvant.

The insulated electric wire has an insulating layer formed by the application followed by curing by baking of the aforesaid insulating material to the conductor, and is superior in heat resistance against a hot environment, and has favorable soldering properties, and can be mass-produced with a constant and high quality at a wide range of a baking temperatures, especially when processed in a large heating furnace having substantial temperature variations.

Without intending to be bound by any hypothesis, it is likely that the above-mentioned advantages of the insulated electric wire are obtained because the enhanced heat resistance depends on the structure of an aromatic polyamide based on the anhydrotrimellitic acid. The favorable soldering property or the ability for thermal decomposition during soldering depends on the structure of an aliphatic polyamide based on the aliphatic dicarboxylic acid. For the effective reaction at a wide range of the baking temperatures in the first electric wire a constituent of the aromatic dicarboxylic acid keeps a balance between environmental temperature resistance and the favorable thermal decomposition at the higher temperature for good soldering characteristics. In the second electric wire the presence of a hydroxyl group in the side chain of the adjuvant epoxy resin enhances a uniform baking of the applied insulating material. Further, in the second electric wire, the presence of an ether linkage and an aromatic linkage in the epoxy resin advantageously protects against high humidity and thus enhances the humidity-resistance of the insulating layer, while the aforesaid hydroxyl group serves also as a flux for a solder to be used.

The polyamide-imide is made by the reaction resulting from dissolving in a suitable solvent and then heating the anhydrotrimellitic acid and dicarboxylic acid and the diisocyanate compound. For satisfactory synthesis of the polyamide-imide the reaction should take place between all acid groups and the diisocyanate compound in approximately equimolar proportions. More specifically, in accordance with the present invention the molar ratio of the diisocyanate compound to every acid group is between about 0.9:1.0 and about 1.1:1.0. This means that, if the amount of the diisocyanate used is less than about 0.9 mole per each mole of acid the applied coat of the insulating material will become worse in appearance and flexibility, and if the amount of the same is more than about 1.1 mole per each mole of acid, the insulating coating material becomes unsuited for practical use due to gelling.

For the first insulated electric wire where the aliphatic dicarboxylic acid and the aromatic dicarboxylic acid are used together as the dicarboxylic acid component, the molar ratio of the aliphatic dicarboxylic acid to each acid component is suitably in a range from about 0.2:1.0 to about 0.7:1.0. This means that, if the amount of the aliphatic dicarboxylic acid is less than about 0.2 mole per each mole of all acid components, the soldering properties become inferior, and if the amount of the same is more than about 0.7 mole, the effective range of the acceptable baking temperature variation becomes narrow and lowers the resistance of the insulator to hot environments.

The mole ratio of the anhydrotrimellitic acid to all acid components is suitably in a range of from about 0.2:1.0 to about 0.7:1.0. This means that, if the amount of the anhydrotrimellitic acid is less than about 0.2 mole per each mole of all acid components, the temperature resistance of the plastic declines to a great extent, and if the amount is more than about 0.7 mole, the soldering properties decline substantially.

In the second insulated electric wire where the aliphatic dicarboxylic acid is used mainly as the dicarboxylic acid component, suitably only the aliphatic dicarboxylic acid is used for improving the soldering characteristics, but is can also be used together with a small proportion of the aromatic dicarboxylic acid (e.g. in less than a 30% mole proportion). The molar ratio of the anhydrotrimellitic acid to all acids is suitably in a range of from about 0.4:1.0 to about 0.8:1.0. This means that, if the anhydrotrimellitic acid is less than the desired range, the heat resistance can greatly decline, and if the proportion of the same is more than the desired range, the soldering properties will substantially decline.

Various saturated aliphatic dicarboxylic acids can be used in the synthesis of polyamide-imide. Particularly those of such acids are suitable that contain two or more carbon atoms in an alkylene group, such as succinic acid, adipic acid, azelaic acid, sebacic acid, didodecanoic acid, and the like. Two or more of the acids can also be used in admixture.

Suitable aromatic dicarboxylic acids that can be employed in accordance with the present invention include terephthalic acid, isophthalic acid, phthalic acid, and the like, and also acids having a plurality of aromatic rings. Two or more of the acids can also be use in admixture. Suitable dicarboxylic acids having a plurality of aromatic rings include biphenyl-4,4'-dicarboxylic acid, thiodibenzonic acid, 4,4'-hydroxydibenzonic acid, thiobenzonic acid, 4,4'-carbonyldibenzonic acid, 4,4'-sulfonyldibenzonic acid, 4,4'-naphthalenedibenzonic acid, 1,5-naphthalenedibenzonic acid, 2,6-naphthalenedibenzonic acid, and the like.

Toluene diisocyanate, hexamethylene diisocyanate, 4,4'-diphenylmethane diisocyanate, 4,4'-diphenyl ether diisocyanate, 1,5-naphthalene diisocyanate, and the like can be employed as the diisocyanate. Two or more diisocyanates can be used in admixture.

The polyamide-imide prepared in accordance with the present invention is the insulating coating in itself in the first insulated electric wire, but in the second insulated electric wire the polyamide-imide is combined with the epoxy resin adjuvant.

The insulating coating material of the second insulated electric wire contains from about 1 to about 30 parts by weight of the epoxy resin per 100 parts of the polyamide-imide. This means that, when less than about 1 part wt. of the epoxy is used, it is not effective because the effective baking temperature range that can be used becomes a narrow one and the soldering qualities decline. Conversely, when the weight proportion of the epoxy resin is more than about 30 parts, the heat resistance of the material to a hot environment will substantially decline.

Any epoxy resin material can be employed as an adjuvant in accordance with the present invention. Suitable examples include a bisphenol A type epoxy resin, a bisphenol F type epoxy resin, a bisphenol S type epoxy resin, a novolak type epoxy resin, a bisphenol bromide A type epoxy resin, an alicyclic type epoxy resin, a tetrafunctional epoxy resin, and so on. The bisphenol bromide A type epoxy resin is most suitable from the above examples due to its favorable contribution to desirable properties.

(A) First insulated electric wire

Figure 1:
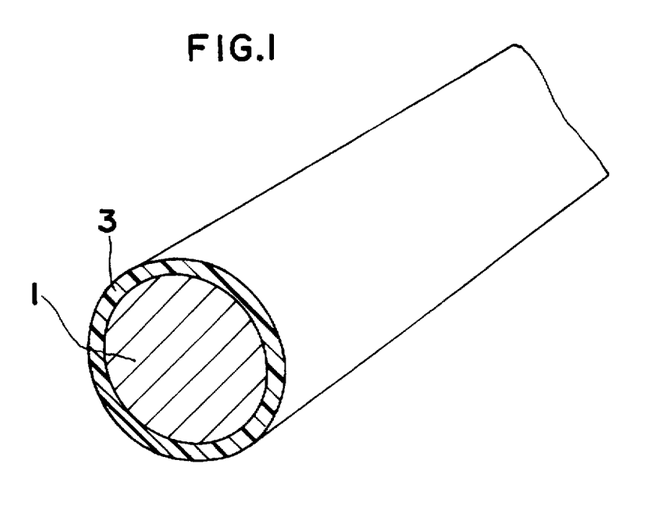
FIG. 1 is a perspective view of an insulated wire in accordance with the present invention having a single insulating coating.

In process of manufacturing the first insulated electric wire 1 of the present invention as shown in FIG. 1, the insulating coating material 3 is treated with a suitable diluent for adjusting its viscosity, and is then normally applied, such as by a pass-through dip, to a wire such as a soft copper wire, and finally baked so that an insulating layer is formed on the conductor. The thickness of the layer varies according to the diameter of separate conductors, but is typically from about 5 μm to about 50 μm. The required thickness is obtained by repeated application, and some times baking.

Figure 2:
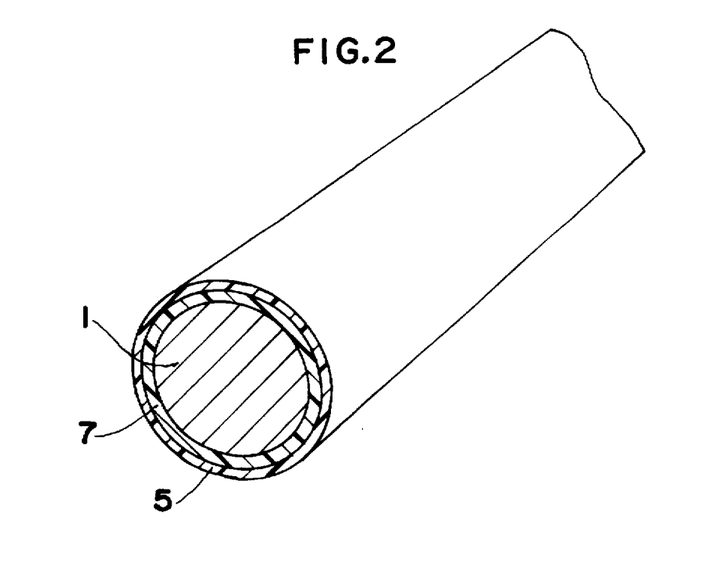
FIG. 2 is a perspective view of an insulated wire of the invention, having a plurality of insulating coatings.

A first insulated electric wire 1 of the present invention that is shown in FIG. 2, has a modified version of the insulated resin of two or more insulating coating layers applied onto the conductor, in which one or two more insulating layers are formed by applying the insulating coating to the already existing insulating layer on the conductor and baking it. Such a multi-coated wire can contribute the required different properties separately through each of the layers. Thus the external cover layer 5 can possess a properties such as resistance to softening and to abrasion and have good cohesiveness, whereas the favorable soldering properties can be obtained through the polyamide-imide internal 7 layer. In this case, the favorable soldering properties are effectively secured because the external cover layer 5 is also removed as the internal layer 7 is removed from the surface of the conductor by thermal decomposition. This takes place even if the external layer is less likely to become subject to thermal decomposition during soldering. This result is also obtained in the case of two or more external layers over an innermost external layer of good soldering characteristics.

The insulating coating material used for the external layer 5 in the first insulated wire of the present invention is not limited to any specific variety. Suitable examples of materials for external coating larger include for good temperature resistance or softening resistance a polyamide, a polyamide-imide that is different from the polyamide-imide of the internal layer. For good abrasion resistance a polyamide-imide such as 6,6-nylon (polyhexamethylene adipamide) is acceptable. An insulating material of good cohesive is described below that is useful for maintaining the shape of coil wires in electric motors and transformers.

A suitable example of a polyamide-imide outer layer material that is different from the internal layer contains as main component a common polyamide-imide produced by reaction between an anhydrotrimellitic acid and a diamine. However, it is possible to use a different polyamide-imide that contains other constituents. A conventional cohesive insulating material for an insulating coat of electric wires suitably a polyvinyl butyryl resin, an epoxy resin, a phenoxy resin, a copolyamide resin, a polysulfone resin, a polyester resin, and a polyester imide can be employed as an example of a material that has good cohesiveness. Two or more of these recited materials can also be used in admixture.

The first insulated electric wire of the present invention is further illustrated by the following examples compared to the following controls according to the prior art. Unless specifically stated otherwise, the examples and controls were used to prepare an insulated electric wire in accordance with Example 1, for soldering tests.

EXAMPLE 1

A polyamide-imide insulating coating is prepared by reacting at 100° C. 0.2 mole of anhydrotrimellitic acid, 0.1 mole of terephthalic acid, 0.7 mole of adipic acid, acid 1.0 mole of 4,4'-diphenylmethane diisocyanate added into N-methyl-2-pyrrolidone for one hour, and then at 120° C. for two hours, and then gradually heated to 140° C. in one hour, and then further reacted for one hour, and then cooled and diluted with xylene. The polyamide-imide insulating coating was applied several times to the surface of a soft copper wire conductor having a diameter of 0.5 mm, and was repeatedly baked until a coated layer of 16 µm in thickness was formed on the conductor, resulting in an insulated electric wire suited for soldering.

EXAMPLE 2

The process of Example 1 was followed, except the anhydrotrimellitic acid, terephthalic acid and adipic acid were employed at a molar proportion of 0.4 mole, 0.3 mole and 0.3 mole, respectively.

EXAMPLE 3

The process of Example 1 was followed, except the anhydrotrimellitic acid, terephthalic acid and adipic acid were employed at a molar proportion of 0.7 mole, 0.1 mole and 0.2 mole, respectively.

EXAMPLE 4

The process of Example 3 was followed, except the 0.1 mole of isophthalic acid and 0.2 mole of azelaic acid were used, respectively.

CONTROL 1

The process of Example 1 was followed, except the anhydrotrimellitic acid, terephthalic acid and adipic acid were employed at proportions of 0.1 mole and 0.8 mole, respectively.

CONTROL 2

The process of Example 1 was followed, except anhydrotrimellitic acid, terephthalic acid and adipic acid were used in a molar ratio of 0.8 mole, 0.1 mole and 0.1 mole, respectively.

CONTROL 3

The process of Example 1 was followed, except that no terephthalic acid was used, and each of the anhydrotrimellitic acid and adipic acid were changed to 0.5 mole and 0.5 mole, respectively.

CONTROL 4

The process of Example 1 was followed, except that an insulating coating material of a modified polyester imide, was used that is sold under the trade name FS-2 by Dainichi Seika Co. Ltd.

CONTROL 5

The process of Example 1 was employed but with the amount of 4,4'-diphenylmethane diisocyanate was changed to 0.8 mole.

CONTROL 6

The process of Example 1 was employed but with the amount of 4,4'-diphenylmethane diisocyanate was changed to 1.2 mole. The reaction took place as in Example 1, but no polyamide-imide coating material could be produced because the reactant gelled.

EXAMPLE 5

The process of Example 3 was employed except a first layer having a thickness of 8 µm wa formed on the soft copper wire having a diameter of 0.5 mm by the repeated applying and baking of the insulating coating material. Next, a different insulating coating material of polyamide was applied, which is sold under the trade name PYRE ML by Du Pont Co., Ltd., was applied repeatedly to the already existing first layer and was baked repeatedly until a second layer of 8 µm in thickness formed on the first layer, so that a double-covered, insulated electric wire was obtained.

CONTROL 7

The internal layer of a double-coated wire was prepared of the modified polyester imide of Control 4. The process of Example 5 was used in other respects to prepare a double-covered, insulated electric wire.

EXAMPLE 6

A first layer having a thickness of 8 µm was formed with the polyamide-imide prepared as in the Example 3, in a thickness of 0.5 mm by the repeated applying and baking of the coating material. Next, a polyamide-imide coating sold under the trade name H I 405 by Hitachi Kasei Co., Ltd., was repeatedly applied over the first layer and was baked repeatedly until the coated second layer had a thickness of 8 μm.

CONTROL 8

An internal insulating layer was formed over a wire as in Control 4, and the process of Example 6 was used to prepare double-covered, insulated electric wire suited for soldering.

EXAMPLE 7

The coating insulating material of the polyamide-imide of Example 3 was used for a first layer having a thickness of 14 μm coated over a soft copper wire having a diameter of 0.5 mm, by the repeated applying and baking of the coating. Next, different coating of 6,6-nylon, prepared by dissolving it in a cresylic acid sold under the trade name AMYLAN CM3001N by Torey Co., Ltd., and was applied over the first layer and was baked repeatedly until a cohesive second layer of 8 μm in thickness was formed on the first layer.

CONTROL 10

The modified polyester imide of Control 4 was used for the internal coat, and the insulated wire was completed as in Example 8.

EXAMPLE 9

A polyamide sold under the trade name PA-27 by Dainichi Seika Co., Ltd., was used to prepare a coated wire as in Example 8.

CONTROl 11

The polyester imide prepared as in Control 4 was used as the internal layer. The insulated wire was completed as in Example 9.

Each of the insulated electric wires obtained in Examples 1 to 9 and the Controls 1–2, and 4–11 for outward appearance, flexibility, softening-resistance, good soldering qualities, heat and shock resistance, effective range of the baking temperature (for the Examples 1–5 and Control 3), abrasion resistance (for the Examples 1 to 5 Control 9), and cohesiveness (for the Examples 8, 9 and Controls 10 and 11). The outcome of all of these tests are shown in Tables 1 an 2 below. Each of the respective tests is conducted according to the appropriate provisions of JIS (Japanese Industry Standard).

The following is a description of the various tests referred to herein from the aforesaid JIS.

4. Appearance

The wire shall be examined, as wound on bobbin, for existence of flaw and stain, by naked eye to determine its appearance.

6. Pin Hole

Take a test piece of about 1.5 m in length for conductor diameter of 0.06 mm or less about 6 m in length for conductor diameter of 0.07 mm or more, carry out heat treatment for about 10 min in a thermostatic oven kept at a specified temperature (if not specified, the temperature shall be 125°±3° C.).

After heat treatment, without bending nor stretching, dip the test piece in 0.2% sodium chloride aqueous solution added with proper quantity of alcohol solution of 3% phenolphthalein, about 1 m in length for conductor diameter of 0.06 mm or less, and 5 m in length for conductor diameter of 0.07 mm or more, apply d.c. 12 V for 1 min, by making the solution as positive and conductor of test piece as negative, and then examine the number of pin holed generated.

8. Flexibility 8.1 Round Wire

The flexibility of round wires shall be investigated by elongation for conductor diameter of 0.35 mm or less, and by winding for that of 0.37 mm or more.

(2) Coiling

Take 3 test pieces of proper length from the same bobbin, concerning each test piece, wound the specimen on its own circumference or on a round bar of smooth surface having a specified diameter for 10 turns, so that the wire will contact closely each other, and then visually check whether visible cracks appear or not on the film.

9. Adherence

The adherence shall be investigated on the conductor of not more than 1.6 mm diameter. Take 3 test pieces of about 35 cm in length, on each test piece mark lines with a gauge length of 250 mm, elongate the specimen at a rate of about 4 m/s until cutting off, and then investigate by a magnifying glass of about 15 magnifications, whether visible cracks appear or not on the film.

10. Resistance to Abrasion

The abrasion resistance shall be investigated on the conductor of not less than 0.26 mm in diameter under the conditions of temperature 20°±10° C. humidity 65±15%. Take 2 test pieces of proper length from the same bobbin, wipe them with clean cloth or paper, fit them separately on the sample stand after straightened by about 1% elongation by the testing machine.

Next, fix the piano wire of 0.23±0.01 mm in diameter the surface of which is smooth and free from stain, to the abrasion head, put a load (initial load is desirable 90% of the specified load) on the cradle, set down the abrasion head quietly on the surface of wire and let it travel. Increase the load until the conductor is exposed and the abrasion head is stopped. Read the scale of load arm at this time and let the product of this scale value and load as the load to failure. Carry out the measurement by rotating the wire from the initial position 120° and 240° along the circumference, at each 3 positions for 2 wires, and obtain the mean value and the minimum value.

12. Resistance to Softening

The measurement of resistance to softening shall be carried out in accordance with ring crossing method for the conductor diameter of not more than 0.19 mm, with crossing method for not less than 0.20 mm and with steel ball method for rectangular wires. Test shall be carried out in such a way that an a.c. voltage of 100 V of nearly sinusoidal wave at 50 or 60 Hz is applied between conductors or between conductor and steel ball, under that condition the temperature is raised at a rate of about 2° C./min, the temperature at the time of short-circuit is measured by fixing thermocouple at the nearest part of the sample. The short circuit current, at that time, is adjusted to 5 to 20 mA.

(2) Crossing Method

Take 2 test pieces of about 15 cm in length from same bobbin, place them on a flat plate one upon another meeting at right angles, put the appropriate dead weight the piled part, put this assembly in a thermostatic oven, and then carry out measurement.

13. Resistance to Thermal Shock 13.1 Round Wire

For round wires, the test shall be carried out by elongation for conductor diameter of 0.08 to 0.35 mm and with winding for conductor diameter of not less than 0.37 mm.

(2) Winding

Take 3 test pieces of about 50 cm in length from the same bobbin, wind them on a round bar of smooth surface having the specified diameter for 10 turns so that the wire will contact closely each other, heat them in a thermostatic oven kept at a specified temperature for 1 h. Take out the test piece from the thermostatic oven, allow them to return to ordinary temperature, and then visually check whether visible cracks appear or not on the film.

16. Solderability

For the solderability, take 3 test pieces of about 15 cm in length from the same bobbin, concerning each of them, dip the test piece tip of about 40 mm in the 50 Sn soft solder, kept at a specified temperature for specified hours, take it out, immediately wipe lightly with suitable cloth, and then examine the dipped part excluding the upper part of about 10 mm whether the soft solder is adhered uniformly or not. However, for the conductor diameter of 0.10 mm or less, judgment may be made on the central part of about 30 mm, by dipping about 50 mm using coiling jig.

17. Bonding

Wires of 0.21 to 1.4 mm conductor diameter are subjected to the following bonding test.

Take 3 test pieces of proper length from the same bobbin, and coil each of them, on a mandrel of smooth surface having the appropriate diameter for about 50 turns so that the wire will contact closely each other by applying the appropriate tensile force as given in Table 5 with the number of revolutions of about 100 rpm. Next, stand the test pieces as coiled on the mandrel vertically on the jig, place the appropriate dead weight it, confirm that each turn is adhered closely in proper alignment, heat the assembly in a thermostatic oven kept at a specified temperature for 30 min, and then take it out from the thermostatic oven. After cooling down to ordinary temperature remove the test piece from the mandrel, fix one end of the test coil and hang the specified dead weight to the other end, and then confirm that no separation occurs between turns of the test coil. Provided that, 40 turns in the central part is considered as the object of this test.

| | |
|---|---|
| Outward appearance | JIS C 3003 4. |
| Flexibility | JIS C 3003 8.1 (2) |
| Heat and shock resistance | JIS C 3003 13.1 (2) |
| Softening-resistance (Temperature at which the softening begins) | JIS C 3003 12. (2) |
| Favorability to soldering (Time took for thermal decomposition) | JIS C 3003 16. |
| Abrasion resistance | JIS C 3003 10 |
| Cohesiveness | JIS C 3003 17. |

Effective baking temperature range was found under conditions, considering that the softening begins at a temperature of more than 340° C., and over that temperature thermal decomposition takes place in less than 6 seconds at 460° C., and its linear velocity is constant.

| | Appearance | Heat and shock resistance | Softening resistance (°C.) | Solderability (seconds at 460° C.) | Baking temp. range (°C.) |
|---|---|---|---|---|---|
| Example 1 | Good | Good, kept the same diameter | 350 | 2 | 60 |
| Example 2 | Good | Good, kept the same diameter | 380 | 3 | 60 |
| Example 3 | Good | Good, kept the same diameter | 410 | 5 | 50 |
| Example 4 | Good | Good, kept the same diameter | 400 | 4 | 50 |
| Control 1 | Good | Good, kept the same diameter | 300 | 2 | — |
| Control 2 | Good | Good, kept the same diameter | 400 | 10 | — |
| Control 3 | Good | Good, kept the same diameter | 360 | 3 | 30 |
| Control 4 | Good | Good, kept the same diameter | 320 | 8 | — |
| Control 5 | Poor | Bad, expanded to twice the diameter | 340 | 2 | — |

The results of the various tests in the preceding table make it clear that single-coated, insulated electric wires of the present invention in Examples 1 to 4 were remarkably superior in heat resistance and quality of soldering in comparison with the conventional insulated electric wire of the modified polyester imide of Control 8. When compared with the insulated electric wire in Control 7, which was coated with an insulating layer of a polyamide-imide formed from the reaction of anhydrotrimellitic acid, aliphatic dicarboxylic acid and diisocyanate compound, the coated electric wires of the invention in the Examples 1 to 4 had an equally good heat resistance and an equally good or greater degree of quality of soldering, and can also be simply mass produced because the effective temperature baking range of the polyamide-imide is between about 50° C. and about 70° C. of about two times, and had a sufficient degree of other required properties.

Contacting the results of Examples 1 to 4 with Controls 1 and 2 an insulated electric wire having sufficient heat resistance and good soldering properties can be obtained where in the case of a polyamide-imide the molar ratio of the aliphatic dicarboxylic acid to each acid component is in a range from about 0.2:1.0 to about 0.7:1.0, and the molar ratio of the anhydrotrimellitic acid to every acid component is in a range of from about 0.2:1.0 to about 0.7:1.0. And comparing Examples 1 to 3 with respect to heat resistance and favorable soldering properties can be duly controlled by changing the proportions of the components within the respective ranges mentioned above. It is clear from the result of Control 5, that the outward appearance and the heat and shock resistance of the coated insulating layer becomes worse where the concentration of the diisocyanate compound is lower than that of every acid component.

| Ingredients for synthesis of the polyamide-imide | Polyamide-imide | | | | | |
|---|---|---|---|---|---|---|
| | A1 | A2 | A3 | A4 | A5 | A6 |
| Anhydrotrimellitic acid | 1.0 | 1.2 | 1.6 | 1.2 | 1.8 | 0.6 |
| Adipic acid | 1.0 | 0.8 | 0.4 | — | 0.2 | 1.4 |
| Azelaic acid | — | — | — | 0.8 | — | — |
| 4,4'-diphenylmethalene diisocyanate | 2.0 | 2.0 | 2.0 | 2.0 | 2.0 | 2.0 |

| | Appearance | Heat and shock resistance | Softening resistance (°C.) | Solderability (seconds at 460° C.) | Abrasion resistance | Cohesiveness at 160° C. for ten minutes |
|---|---|---|---|---|---|---|
| Example 5 | Good | Good, kept the same diameter | 430 | 8 | — | — |
| Control 7 | Good | Good, kept the same diameter | 340 | 12 | — | — |
| Example 6 | Good | Good, kept the same diameter | 420 | 8 | — | — |
| Control 8 | Good | Good, kept the same diameter | 330 | 12 | — | — |
| Example 7 | Good | Good, kept the same diameter | 410 | 5 | 1100 | — |
| Control 9 | Good | Good, kept the same diameter | 300 | 8 | 750 | — |
| Example 8 | Good | Good, kept the same diameter | 410 | 8 | — | 600 |
| Control 10 | Good | Good, kept the same diameter | 320 | 12 | — | 600 |
| Example 9 | Good | Good, kept the same diameter | 400 | 5 | — | 1000 |
| Control 11 | Good | Good, kept the same diameter | 300 | 8 | — | 1000 |

The preceding table shows the results on the insulated wires coated with two insulating layers, including an internal layer of the insulating material having good soldering properties, and an external layer of a different insulating material. Compared with the double-coated electric wires in the Controls 7–11 of a modified polyester imide as the internal layer, the insulated electric wires of the present invention in Examples 5 to 9 using the specific polyamide-imide or the internal layer, had a greatly enhanced heat resistance and an improved soldering characteristics, and had a sufficient degree of other required properties. Where the polyamide were used for the external layer as in the Example 7 and Control 9, the abrasion resistance was greatly enhanced.

(B) Second insulated electric wire

As the main component of the insulating material, each of the polyamide-imides A1 to A6 shown in the next table were prepared by adding anhydrotrimellitic acid, a saturated aliphatic dicarboxy acid and diisocyanate in the molar proportions shown respectively in the next table into N-methyl-2-pyrrolidone, and reacted at 100° C. for one hour, subsequently at 120° C. for two hours, and then they were heated gradually to 140° C. in one hour and were allowed further to react for a further hour.

Moles of ingredients in preparing the polyamide-imide component

Each of the insulating materials shown by the Examples 10 to 17 in the next table was prepared by adding epoxy resin and xylene as diluent to each of the solutions of the polyamide-imides A1 to A6 and then stirred at 60° C. for one hour. The so prepared insulating materials were repeatedly applied to the surface of a soft copper wire conductor having a diameter of 0.5 mm, and baked after each application one until a coated layer of 16 μm thickness was formed on the conductor, so that the respective single-coated insulated electric wire with good soldering characteristics was obtained. The following epoxy resins were used with the polyamide-imide:

Ep 1 ... Epicout EP1001 a bisphenol A type epoxy sold under the trade name by Yuka Shell Co., Ltd.

Ep 2 ... A bisphenol F type epoxy sold under the trade name YPF-2001 by Touto Kasei Co., Ltd., and Ep 3 ... A bisphenol bromide A type epoxy sold under the trade name YDB-406 by Touto Kasei Co., Ltd.

Each of the insulating materials of Examples 12 to 16 in the next table differed by the proportions of the polyamide-imide and the epoxy resin. An insulated electric with good soldering properties was made with the materials of Examples 10–17.

| Composition of the insulating material - (parts wt.) | | | | | | | | |
| --- | --- | --- | --- | --- | --- | --- | --- | --- |
| Examples | 10 | 11 | 12 | 13 | 14 | 15 | 16 | 17 |
| Polyamide-imide* | | | | | | | | |
| A1 (5/5) | 100 | — | — | — | — | — | — | — |
| A2 (6/4) | — | 100 | 100 | 100 | — | 100 | 100 | — |
| A3 (8/2) | — | — | — | — | 100 | — | — | — |
| A4 (6/4) | — | — | — | — | — | — | — | 100 |
| Epoxy Ep1 | 20 | 20 | 1 | 30 | 20 | — | — | 10 |
| Epoxy Ep2 | — | — | — | — | — | 20 | — | — |
| Epoxy Ep3 | — | — | — | — | — | — | 20 | — |
| Controls | | 12 | | 13 | 14 | 15 | | 16 |
| Polyamide-imide* | | | | | | | | |
| A2 (6/4) | | — | | — | 100 | 100 | | 100 |
| A5 (9/1) | | — | | 100 | — | — | | — |
| A6 (3/7) | | 100 | | — | — | — | | — |
| Epoxy resin Ep1 | | 20 | | 20 | 0.5 | 40 | | — |

*Molar ratio of anhydrotrimellitic acid to dicarboxylic acid.

Various tests were conducted with the insulated electric wires prepared with the materials of Examples 10 to 16 and the Controls 12 to 16. The outward appearance, pinholes, close adherence, soldering properties, softening-resistance, moisture and heat resistance, and effective range of the baking temperature were determined. The results of these tests are shown in the next table. Each was conducted according to provisions of JIS (Japanese Industry Standard).

pared to the insulated electric wire in Control 16, which was coated with an insulating layer of polyamide-imide formed from the reaction of anhydrotrimellitic acid, aliphatic dicarboxylic acid and diisocyanate. The coated wires of the invention of Examples 10 to 17 had good soldering quality and good moisture and heat resistance, and were suitable for mass production because the effective baking temperature range is 40° C. to 80° C.

By comparing the results of Examples 11–13, 15, 16 with controls 14–16, it appears that the insulating material of the second insulated electric wire in accordance with the present invention should contain from about 1 to about 30 parts by weight of the epoxy resin per 100 parts of the polyamide-imide for satisfactory heat resistance and good soldering characteristics and for good adhesiveness. In addition, from a comparison of Examples 10, 11, 14 with the Control 12, 13, it appears that suitably the molar proportions of the anhydrotrimellitic to the dicarboxylic acid are in a range of from about 5:5 to about 8:2. A review of Examples 10 to 17 suggests that both the heat resistance and soldering characteristics can be effected by varying the proportions of the above-mentioned constituents of the polyamide-imide and the proportion of the epoxy resin within the aforementioned ranges.

EXAMPLE 18

The polyamide-imide insulating material of Example 11 was applied as a first layer having a thickness of 8 μm over a soft copper wire having a diameter of 0.5 mm by the repeated applying and baking of the coating. Next a poly-

| | | | | | | |
| --- | --- | --- | --- | --- | --- | --- |
| Outward appearance | JIS C 3003 4. | | | | | |
| Pinholes | JIS C 3003 6. | | | | | |
| Close adhesiveness | JIS C 3003 9. | | | | | |
| Favorability to soldering (Time took for thermal decomposition) | JIS C 3003 16. | | | | | |
| Softening-resistance (Temperature at which softening occurs) | JIS C 3003 12. (2) | | | | | |
| Moisture and heat resistance | With two twisted samples, dielectric breakdown voltage was measured after standing for 48 hours in moist air of 180° C. with 0.2 percentage of H₂O | | | | | |
| Effective baking temperature range | up to where softening begins at more than 340° C., thermal decomposition takes place in less than 6 seconds at 460° C., and a linear velocity is constant. | | | | | |
| | Appearance | Pinholes (numbers) | Softening resistance (°C.) | Good Soldering (seconds at 460° C.) | Effective range of baking temperature (°C.) | Adhesiveness | Heat and shock resistance |
| Example 10 | Good | 0 | 360 | 2 | 60 | Good | Good |
| Example 11 | Good | 0 | 410 | 3 | 60 | Good | Good |
| Example 12 | Good | 0 | 410 | 4 | 40 | Good | Good |
| Example 13 | Good | 0 | 410 | 2 | 80 | Good | Good |
| Example 14 | Good | 0 | 470 | 5.5 | 60 | Good | Good |
| Example 15 | Good | 0 | 410 | 3 | 60 | Good | Good |
| Example 16 | Good | 0 | 410 | 1 | 70 | Good | Good |
| Example 17 | Good | 0 | 360 | 4 | 40 | Good | Good |
| Control 12 | Good | 0 | 330 | 1.5 | 10 | Good | Good |
| Control 13 | Good | 0 | 490 | 10 or more | 10 | Good | Good |
| Control 14 | Good | 0 | 405 | 5 | 20 | Good | Bad |
| Control 15 | Good | 0 | 320 | 2 | 10 | Good | Good |
| Control 16 | Good | 0 | 405 | 5 | 20 | Good | Bad |

From the results of the tests shown in the preceding table, it became clear that the single-coated, insulated electric wires of the present invention of Examples 10–17 had superior heat resistance and soldering characteristics comimide sold under the trade name PYRE ML by Du Pont Co., Ltd., was applied repeatedly over the first layer and was baked repeatedly until an 8 μm thick layer was formed on the first layer.

CONTROL 17

The first layer over a wire was applied from a polyester-imide sold under the trade name PA-27 by Dainichi Seika Co., Ltd. The coated wire was completed as in Example 18.

EXAMPLE 19

A first coating of 8 μm was formed on a 0.5 mm copper wire as in Example 11. A polyamide-imide cover layer was applied of a material sold under the trade name H I 405 by Hitachi Kasei Co., Ltd., until a second layer of 8 μm in thickness was formed.

CONTROL 18

As internal layer the material of Control 17 was applied. The Control was finished as in Control 19.

EXAMPLE 20

The first layer of 14 μm coated over a 0.5 mm copper wire was the material of Example 11. Next, a different coating insulating material of 6,6-nylon prepared by dissolving it in cresylic acid sold under the trade name AMYLAN CM3001N by Torey Co., Ltd was applied repeatedly to the first layer and was baked repeatedly until a second layer thickness of 2 μm was formed.

CONTROL 19

The polyester imide of Control 17 was the first layer applied over a wire, and then Example 20 was used to complete a double-covered, insulated electric wire.

EXAMPLE 21

The polyamide-imide prepared as in Example 11 was applied as the first layer in a thickness of 8 μm over a soft copper wire having a diameter of 0.5 mm. Next a cover layer of an epoxy resin sold under the trade name ISOPOXI 506 by Nippon Syokuzai Co., Ltd., was applied over the first layer and was baked repeatedly until a cohesive second layer of 8 μm thickness was formed.

CONTROL 20

The modified polyester imide of Control 17 was used for an internal layer over a wire, and the procedure was completed as in Example 21.

EXAMPLE 22

A polyamide sold under the trade name PA-27 by Dainichi Seika Co., Ltd. prepared by the same process as in Example 21.

CONTROL 21

The polyester imide internal layer was formed as in Control 17. A coated wire was prepared in accordance with Example 22.

Various tests were conducted on each of the insulated wires prepared by Examples 18 to 22 and Controls 17 to 21. Outward appearance, softening-resistance, suitability for soldering, heat and shock resistance, abrasion resistance and cohesiveness were determined as shown in the next table. The tests for heat and shock resistance, abrasion resistance, and cohesiveness were conducted according to JIS (Japanese Industry Standard). The remaining properties were tested according to the same methods as mentioned above.

| | Appearance | Heat and shock resistance | Softening (°C.) | Good soldering at 460° C. (seconds) | Abrasion resistance (g) | Cohesiveness at 160° C. for 10 minutes |
|---|---|---|---|---|---|---|
| | Heat and shock resistance | | JIS C 3003 13.1(2) | | | |
| | Abrasion resistance | | JIS C 3003 10 | | | |
| | Cohesiveness | | JIS C 3003 17. Good | | | |
| Example 18 | Good | Good, maintained diameter | 430 | 5 | — | — |
| Control 17 | Good | Good, maintained diameter | 340 | 12 | — | — |
| Example 19 | Good | Good, maintained diameter | 420 | 5 | — | — |
| Control 18 | Good | Good, maintained diameter | 330 | 12 | — | — |
| Example 20 | Good | Good, maintained diameter | 410 | 3 | 1100 | — |
| Control 19 | Good | Good, maintained diameter | 300 | 8 | 750 | — |
| Example 21 | Good | Good, maintained diameter | 410 | 5 | — | 600 |
| Control 20 | Good | Good, maintained diameter | 320 | 12 | — | 600 |
| Example 22 | Good | Good, maintained diameter | 400 | 3 | — | 1000 |
| Control 21 | Good | Good, maintained diameter | 300 | 8 | — | 1000 |

The preceding table shows double-coated insulated wires with good soldering characteristics as determined by the internal layer. Comparing the double-coated electric wires of Controls 17 to 21 prepared with a known modified polyester imide for the internal layer with the insulated wires of the present invention of Examples 18 to 22, the specific polyamide-imide internal layer greatly enhanced the heat resistance and solderability and had a sufficient degree of other required properties. Abrasion resistance was greatly enhanced where the polyamide was used for the external layer as in Example 25 and Control 19.

We claim:
1. An insulated electrical wire with good solderability, which comprises an electrical conductor having thereover an insulation of a polyamide-imide copolymer of anhydrotrimellitic acid, a mixture of an aliphatic dicarboxylic acid, and an aromatic dicarboxylic acid, and a diisocyanate, wherein the molar ratio of said diisocyanate to all of said acids is from about 0.9:1.0 to about 1.1:1.0, the molar ratio of said anhydrotrimellitic acid to the total of said acids is from about 0.2:1.0 to about 0.7:1.0, and the molar ratio of said aliphatic dicarboxylic acid to the total of said acids is from about 0.2:1.0 to about 0.7:1.0.

2. The insulated electric wire of claim 1, further comprising from about 1 part wt. to about 30 parts wt. of an epoxy resin adjuvant per each 100 parts wt. of said copolymer.

3. The insulated electrical wire of claim 1, wherein said insulation is a first insulating layer, further comprising a second insulating layer over said first insulating layer, said second insulating layer comprising a polyamide-imide copolymer that is different from said first insulating layer.

4. The insulated electrical wire of claim 1, wherein said insulation is a first insulating layer, further comprising a second insulating layer over said first insulating layer, said second insulating layer comprising a polyamide.

5. The insulated electrical wire of claim 1, wherein said insulation is a first insulating layer, further comprising a second insulating layer over said first insulating layer, said second insulating layer comprising a polyamide copolymer.

6. The insulated electrical wire of claim 1, wherein said insulation comprises a first insulating layer over said electrical conductor, the insulated wire further comprising a polyamide-imide second insulating layer above said first insulating layer.

7. The insulated electrical wire of claim 1, wherein said insulation is a first insulating layer, further comprising a second insulating layer over said first insulating layer, said second insulating layer having a cohesiveness.

8. An insulated electrical wire with good solderability, which comprises an electrical conductor having thereover an insulation of a polyamide-imide copolymer of anhydrotrimellitic acid, a dicarboxylic acid comprised mainly of an aliphatic dicarboxylic acid, a diisocyanate, and from about 1 part by weight to about 30 parts by weight, per 100 parts by weight of the polyamide-imide copolymer of an epoxy resin adjuvant, wherein in said polyamide-imide copolymer the molar ratio of said diisocyanate to the total of said acids is from about 0.9:1.0 to about 1.1:1.0, the molar ratio of said anhydrotrimellitic acid to the total of said acids is from about 0.4:1.0 to about 0.8:1.0.

9. The insulated electrical wire of claim 8, wherein said epoxy resin adjuvant is a bisphenol A bromide.

10. The insulated electrical wire of claim 8, wherein said insulation comprises a first insulating layer over said electrical conductor, the insulated wire further comprising a polyimide second insulating layer above said first insulating layer.

11. The insulated electrical wire of claim 8, wherein said insulation comprises a first insulating layer over said electrical conductor, the insulated wire further comprising a polyamide-imide second insulating layer above said first insulating layer, said second insulating layer being different from said first insulating layer.

12. The insulated electrical wire of claim 8, wherein said insulation comprises a first insulating layer over said electrical conductor, the insulated wire further comprising a second insulating layer above said first insulating layer, said second insulating layer having a cohesiveness.

* * * * *